United States Patent

[11] 3,581,073

[72] Inventor Wilbur A. Visher
    Ambler, Pa.
[21] Appl. No. 799,743
[22] Filed Feb. 17, 1969
[45] Patented May 25, 1971
[73] Assignee Narco Scientific Industries, Inc.
    Fort Washington, Pa.

[54] ELECTRONIC COURSE LINE COMPUTER
    12 Claims, 6 Drawing Figs.
[52] U.S. Cl. .................................................. 235/150.26,
    235/186, 235/189, 35/10.2, 343/112(C)
[51] Int. Cl. ........................................................ G06g 7/22,
    G06g 7/78, G01s 7/46
[50] Field of Search ............................................ 235/150.26,
    150.27, 186, 189, 190; 35/10.2; 343/6, 106, 112

[56] References Cited
    UNITED STATES PATENTS
    2,599,889   6/1952   Biggs et al. .................. 235/150.26X
    3,281,844  10/1966   Sabin ............................ 343/112

FOREIGN PATENTS
363,180   8/1962   Switzerland .................. 235/189

*Primary Examiner*—Malcolm A. Morrison
*Assistant Examiner*—R. Stephen Dildine, Jr.
*Attorney*—Paul and Paul ABSTRACT: A method of electronically computing navigational course lines and apparatus for carrying out said method is disclosed, whereby a first vector representation of the aircraft location with respect to a VORTAC station is electronically generated by using the VOR signal to control a chopper circuit which acts on the DME distance voltage; a second vector representation of the location of the destination point with respect to the VORTAC is electronically generated in a similar manner, the bearing and distance information being introduced manually by the pilot; the inverse of said second vector is generated; and said first vector representation and said inverse of said second vector representation are electronically added to obtain a third vector representation of the aircraft location with respect to the destination point. Such third vector representation is then compared with a manually adjusted reference signal to provide course direction control, and is processed to provide range information.

PATENTED MAY 25 1971    3,581,073

INVENTOR.
Wilbur A. Visher
BY
Paul + Paul
ATTORNEYS.

INVENTOR.
Wilbur A. Visher

INVENTOR.
Wilbur A. Visher

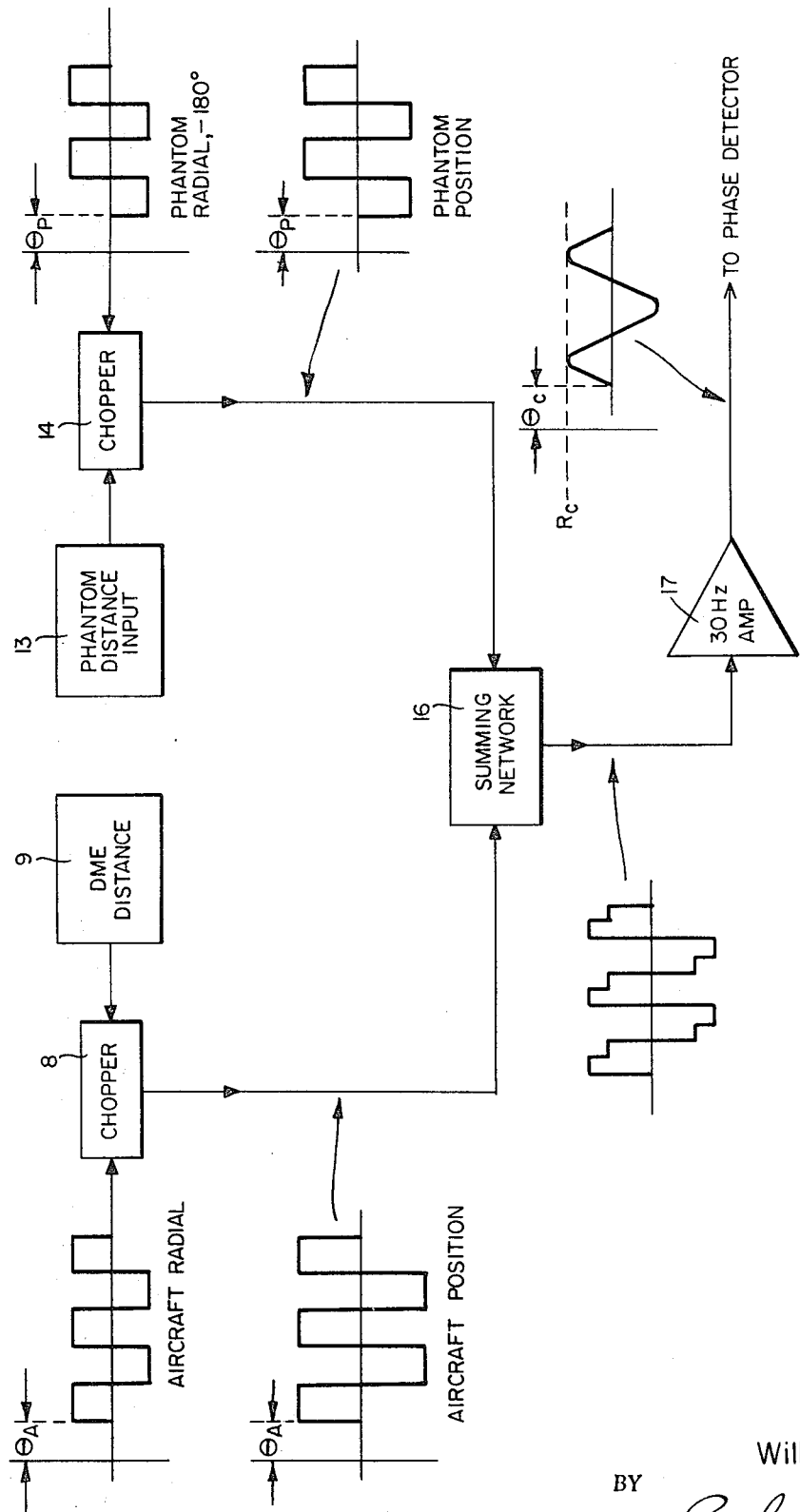

ELECTRONIC COURSE LINE COMPUTER

BACKGROUND OF THE INVENTION

A. Field of the Invention

This invention lies in the field of electronic course line computers and more particularly in the area of navigational computers for use in aircraft.

B. Description of the Prior Art

Radio navigation of aircraft has always been primarily a point-to-point process with guidance along straight line segments between radio transmitting stations. Such navigation has been limited by the number and position of such stations, as well as the information transmitted therefrom. This scheme of navigating an airplane from one position to another has the obvious disadvantages that all traffic is put into specific channels, thereby limiting the directions in which an airplane can proceed and preventing same from travelling directly to the point of destination, as well as wasting much of the available air space. As a practical matter, the only air space used is represented by the air lanes between such radio stations. If a pilot had the capability of routing in a straight line directly from departure point to destination point, this would enable maximum utilization of air space, simplify both the pilot's and ground controller's workload, and appreciably reduce time of flight. Further, in terminal areas, with present equipment, the controller is unable to spread airplanes out and thereby establish an orderly flow to the airport. With present receiving equipment as is generally used in aircraft, this remains a difficult problem, and will remain so as long as there are limited number of stations, which latter condition is made necessary in order to prevent multistation reception at the same frequency.

Today the VOR–DME system is the primary en route guidance system in the United States. The very high frequency omni range (VOR) provides the direction from the airplane to the radio station which transmits the VOR signal. In addition, the distance from said radio station to the airplane is provided by distance measuring equipment (DME). The two coordinates, bearing and distance, provide the relative location of airplane to VORTAC. Both VOR and DME are transmitted from the same station, referred to as VORTAC. Such VORTAC stations are located throughout the country, and there are more than 100,000 aircraft in use equipped to use VOR–DME signals for navigation.

It has long been recognized that any navigation system providing continuous, or nearly continuous, and unambiguous position could be made to serve as an area navigation system, i.e., a system which would free the pilot and the controller from fixed point-to-point navigation, permitting instead random selection of fixes and routes. The VOR–DME system provides sufficient information to be a candidate for area navigation. However, the airborne area navigation devices which are available in the market have not been economically successful. They have been primarily map displays showing continuous position, and are characterized by the deficiencies of large size, high cost, operational inadequacy, and general operating inconvenience. There is no equipment commercially available which can be installed in aircraft ranging from medium-performance single-engine through general aviation twin-engine planes, using VORTAC signals for position, being capable of utilization for en route and terminal-area navigation, and capable of operation by a single pilot. This pressing commercial need, together with the existing network of VORTAC stations and the familiarity of users with standard VOR–DME equipment, points to an electronic course line computer utilizing VORTAC signals, and having information displayed in a manner allowing operator interpretation similar to that of normal VOR–DME.

SUMMARY OF THE INVENTION

This invention relates to a new and novel method for continuous computation of the course line from an aircraft to the destination point, and to new and novel means by which such computation is continuously performed. The invention utilizes standard VOR and DME signals and is therefore particularly adapted for use in aircraft having standard receiver equipment. In the preferred embodiment of my invention, means are provided for receiving and processing the 30 Hz. variable signal transmitted by a VORTAC station, which signal carries a phase representing the bearing of the airplane. This signal is introduced into a squarer circuit which produces a square wave having a same phase as the original 30 Hz. signal. Such square wave in turn controls a chopper circuit which acts upon a DC voltage representing the distance of the plane from the VORTAC. Such DC voltage is automatically supplied by standard DME distance circuitry. By so chopping the DME voltage, an amplitude modulated signal is obtained, carrying both bearing and distance information. Simultaneously, input means detect the VOR reference signal which is provided on a subcarrier at 9,960 Hz. This reference signal is shifted in phase so as to carry the bearing of the destination point (phantom) with respect to the VORTAC. This is accomplished by phase shifter means which are manually adjusted by the pilot, or computer operator. Such phase shifted signal is inverted and then squared and caused to control a chopper circuit which operates, in the same manner as the aforementioned chopper circuit, on a DC voltage which represents the distance of the phantom location from the VORTAC. This distance voltage is manually set by the pilot. The resulting signal is a pulse waveform carrying phase and magnitude information representative of the vector from the phantom to the VORTAC. Thus, by the method of obtaining pulse waves by chopping DC voltages representing the distances from the VORTAC to the aircraft and to the phantom, two signals are obtained carrying the distance and phase information necessary to compute the vector from the phantom location to the plane. A signal representative of such vector is obtained by adding the two pulse waves in a summing network and filtering the output thereof to obtain only the 30 Hz. fundamental. The result of such filtering is a product representing the addition of two 30 Hz. sinusoids, each bearing distance information in their respective amplitudes, and bearing information in their respective phases, the summation signal thereby carrying an amplitude representative to the magnitude of the phantom to aircraft vector, and a phase representative of the bearing of said vector. The next step in the computation is to generate another 30 Hz. sinusoidal signal having a known phase, which signal can be compared with the summation signal in a phase detector so as to provide an output enabling the airplane pilot to control the bearing of he airplane. Such reference signal is generated by applying the same 30 Hz. VOR reference signal to a manually adjusted phase shifter. The output of said shifter, as well as the derived summation signal, are coupled into a phase detector which yields an output proportional to the amplitude of the summation signal, and to the phase difference between the two input signals. Said output voltage is caused to operate a standard Left-Right, or L–R meter. Consequently, the pilot can, by adjusting the reference signal to a phase 90° different from the summation signal, cause the L–R indicator to go to zero, whereafter the aircraft can be controlled by holding the L–R meter on zero, as is done with standard VOR equipment. Additionally, the characteristics of the phase detector are such as to give a linear reading of the perpendicular error distance of the airplane from the desired course, as opposed to standard VOR equipment which gives an error indication proportional solely to the bearing error. Additionally, the summation signal is processed through a peak-to-peak detector to provide a DME distance output indication of the distance of the airplane to the phantom.

It is thus seen that the method and apparatus provided by this invention utilizes the standard VOR and DME navigational input signals and, by the technique of manually introducing information with respect to the phantom location, and by using simple chopping circuitry to modulate voltages carrying distance information, standard L–R and DME indications can be presented to the pilot, allowing him to navigate the phantom by the same techniques as are used with standard VOR–DME equipment. The linear error offset characteristic of the L–R indication provides an improved navigational characteristic which can be used to advantage by the pilot.

Accordingly, it is an object of this invention to provide a method and apparatus for random course navigation capability, using present VORTAC signals.

Another object of this invention is to provide an electronic course line computer suitable for personal and business aircraft, and utilizing conventional VOR–DME display indicators.

Another object of this invention is to provide an electronic course line computer with minimum panel displays and controls, having simple operation such that it can be used by a single pilot.

A further object of this invention is to provide an electronic course line computer having accuracy as good as that obtained with conventional VOR–DME equipment presently in use, and at a low cost.

A still further object of this invention is to provide apparatus giving an airplane the capability of en route and terminal area navigation, and which facilitates terminal area controller operation.

Yet a further object of this invention, as will be described in detail below, is a course line computer system having the characteristic of linear offset detection and read out.

DESCRIPTION OF THE DRAWINGS

FIG. 6 is a block diagram which includes waveform sketches, indicating how the signals are processed.

DETAILED DESCRIPTION OF THE DRAWINGS

Figure 1:
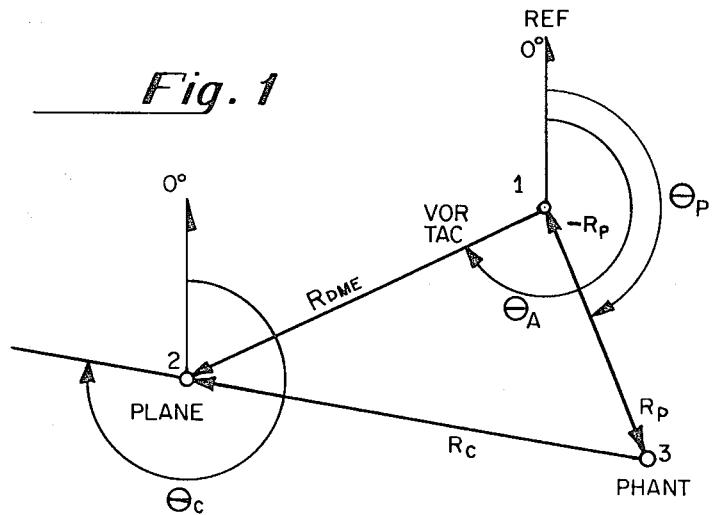
FIG. 1 is a vector diagram showing bearings and distances between an airplane, the VORTAC, and the phantom, or destination point.

FIG. 1 is a vector diagram on which is indicated the navigation problem confronting the pilot, and the manner by which the course line computer solves it. All of the distances and relative bearings of the three locations necessary to the problem are shown. The ground source of radio signal information is represented by the VORTAC 1. The plane 2 is at some fixed bearing and range from VORTAC 1 at the time it makes radio contact with same. The relative position of plane 2 to VORTAC 1 is represented by a vector $R_{DME}$ having a magnitude $R_{DME}$ which represents the range distance between the two points, and an angle $\theta_A$, representing the bearing of the plane 2 with respect to VORTAC 1. The reference direction for all bearings is due North, represented by an arrow marked 0°. It is presumed that the plane desires to proceed on a direct course to a location not identical to VORTAC 1. Such location is designated as phantom 3, which relative location with respect to VORTAC 1 is represented by a vector $R_p$ having a length $R^p$ (the distance from phantom 3 to VORTAC 1) and a bearing angle $\theta_p$ (the bearing of phantom 3 with respect to the 0° reference). The course that the plane desires to follow is the straight line between plane 2 and phantom 3. The position of plane 2 relative to phantom 3 is represented vectorally in FIG. 1 by a vector having a magnitude $R_c$ (the lineal distance between the two points) and an angle $\theta_c$ (the bearing of the path between plane and phantom) with respect to the 0° reference.

The vector $R_c$ is seen to be a summation of the $R_{DME}$ vector and the $-R_p$ vector. Consequently, the indicated navigational computation is that of obtaining a vector representation of $R_p$, inverting same, and adding vectorally a vector representation of $R_{DME}$. This vector summation produces the vector $R_c$. Corresponding to said vector summation, electrical signals can be generated representing said vectors, processed corresponding to the aforementioned vector manipulations, and the resultant analyzed for the distance and bearing information that it carries.

The preferred embodiment of my invention electronically computes the aforementioned navigation problem, and processes the results for display to the pilot. The inputs to the system are the standard VOR–DME signals, from which the $R_{DME}$ vector can be obtained. The vector information for $R_p$, of course, not available from VORTAC. This will be determined by the pilot of airplane 2 by laying the course out on sectional or world aeronautical charts and measuring bearings and distances from a given VORTAC. Such information will then be introduced by the pilot into the course line computer apparatus, enabling it to generate an electrical signal which represents the $R_p$ vector.

Figure 2:
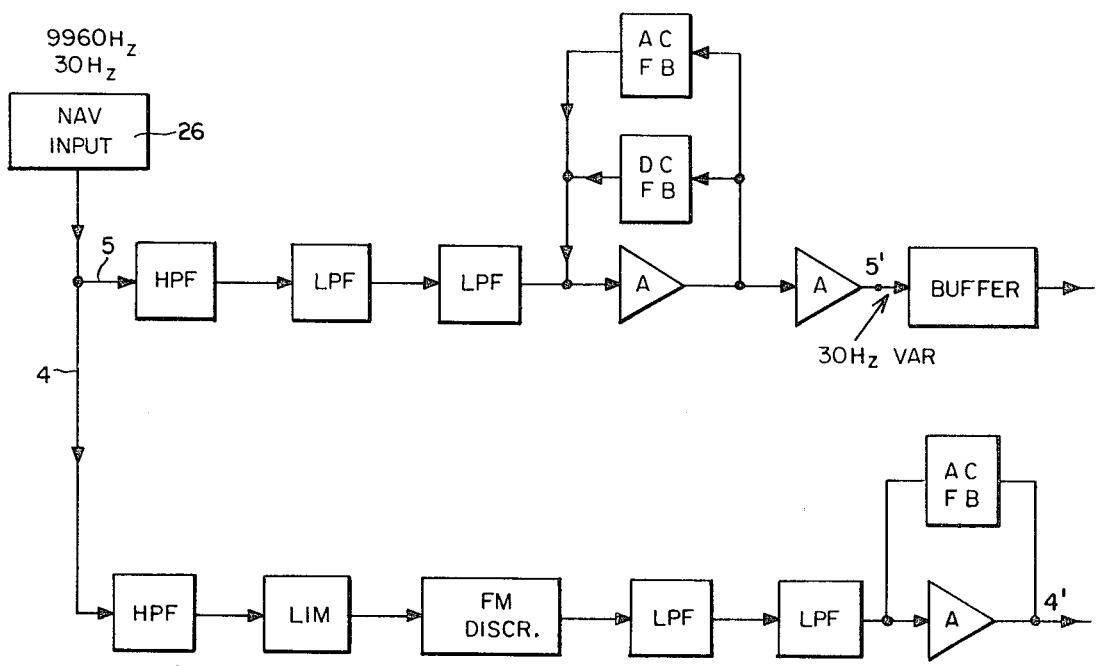
FIGS. 2, 3 and 4 are block diagram representations of sections of a preferred specific embodiment of the invention.
Figure 5:
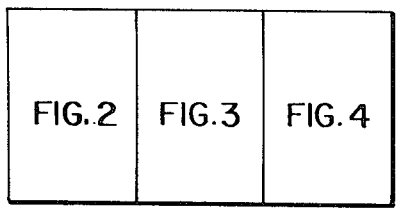
FIG. 5 shows the relationship of FIGS. 2, 3 and 4 and indicates the manner in which the overall block diagram of the entire embodiment is composed.

Referring to FIG. 2, the VOR signals are received by conventional navigation input apparatus 26. This input is compounded of a 9,960 Hz. subcarrier which is frequency modulated by a 30 Hz. reference signal, and a 30 Hz. aircraft radial signal, having a phase with respect to the reference of $\theta_A$. These combined signals from navigation input 26 are coupled to parallel channels designated 4 and 5. Channel 4 filters the 9,960 Hz. subcarrier, limits the signal, detects the 30 Hz. frequency modulation which comprises the reference signal, amplifies same and delivers it at terminal 4'. This signal has a vector representation as shown by the 0° reference signal in FIG. 1. Similarly, channel 5 filters the 30 Hz. aircraft signal, amplifies same, and couples it to terminal 5'. This 30 Hz. signal has a phase represented by $\theta_A$ as shown in FIG. 1.

Figure 3:
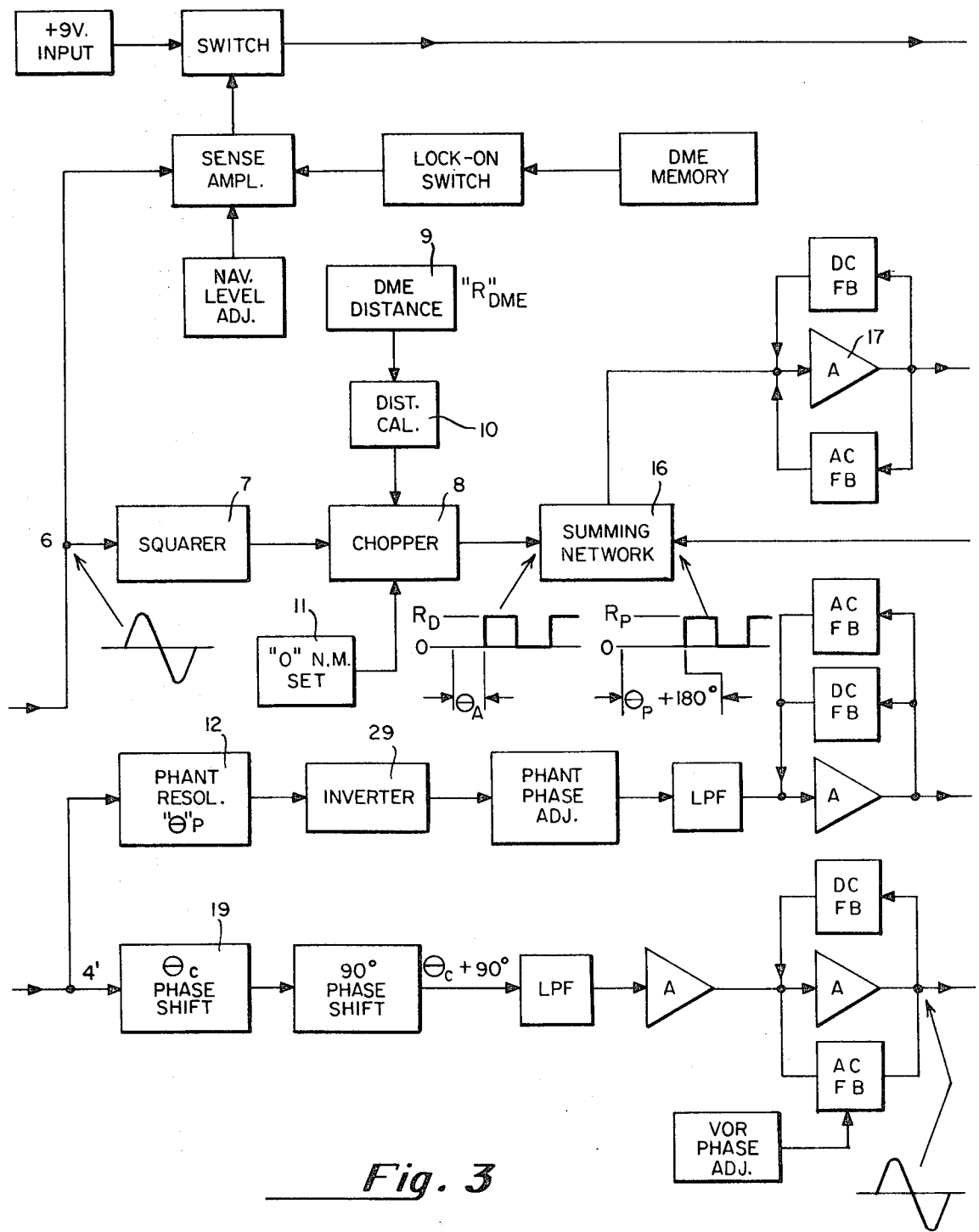

Referring to FIG. 3, the 30 Hz. aircraft signal representing the location of the plane 2 is passed through a squarer 7 which controls a chopper 8. The chopper 8 is an inexpensive but very stable circuit which operates on a DC voltage provided by the DME distance input 9, which voltage represents $R_{DME}$. The action of the chopper is to switch said DME voltage on and off, thus modulating it and thereby generating a pulse waveform having pulse peaks set by the DME distance voltage. In order that such pulse waveform carry an amplitude representing $R_{DME}$, a "zero" nautical mile set circuit 11 adjusts the DC output level of the chopper 8 such that the pulse peak voltage is proportional to the distance in nautical miles from the VORTAC 1 to the plane 2. The pulse waveform produced by chopper 8 carries with it phase angle $\theta_A$ which was transmitted by the original 30 Hz. variable target signal.

Figure 4:
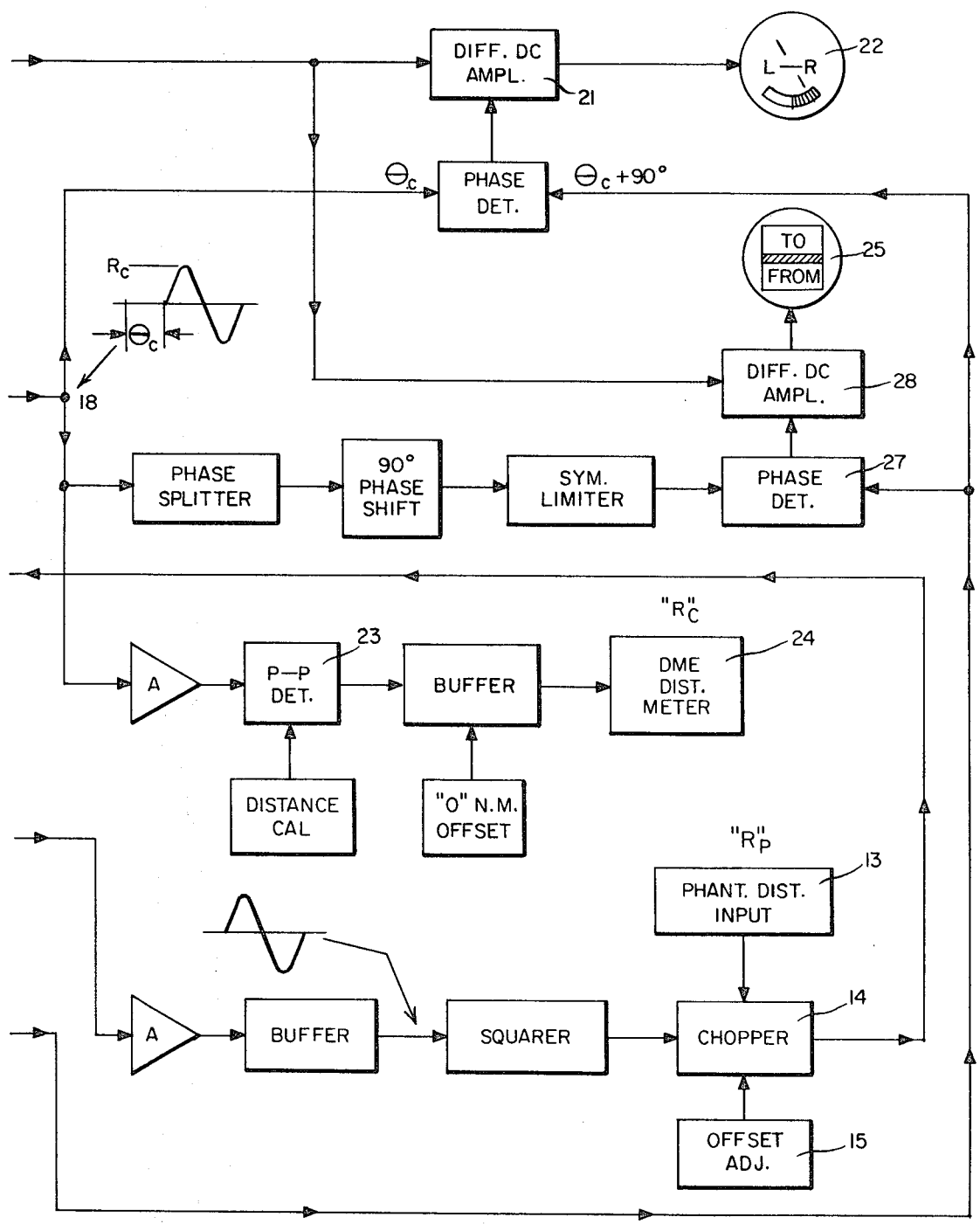

The 30 Hz. reference signal developed at terminal 4' is used to generate a similar chopped signal defining the phantom position relative to the real VORTAC. The radial portion of the signal is obtained by phase shifting said reference VOR signal with phantom resolver 12. The pilot, having obtained angle $\theta_p$ from a map as described hereinabove, manually adjusts phantom resolver 12 so as to introduce a phase shift in the amount of $\theta_p$. This signal is then processed in a manner similar to that used in processing the airplane position signal. The distance from the phantom to the VORTAC, $R_p$, is introduced by the pilot by adjusting a potentiometer in phantom distance input unit 13, seen in FIG. 4. To insure that the scale factor (miles per volt) will be the same as that of the DME signal used in processing the airplane position signal, this potentiometer is supplied from the same voltage buss as is used with the DME distance unit 9. The phase shifted sinusoid appearing at the output of the phantom resolver 12 is inverted in inverter 29, filtered, amplified and then squared. The resulting square wave operates chopper 14, said chopper 14 making and breaking the phantom distance voltage so as to produce a pulse waveform, the pulse peak being proportional to the distance $R_p$. Again, an offset adjuster 15 is utilized so that the output of chopper 14 is proportional to distance.

The circuitry described thus far produces two pulse waveform signals, each carrying amplitude and phase information representing respectively the $R_{DME}$ and $-R_p$ vectors. Referring again to FIG. 3, these two signals are introduced into summing network 16, which network produces an output representing the summation of said two signals. This is fully illustrated in FIG. 6, where the two input signals and the information they carry are shown being coupled into the summing network, and the summation signal is represented at the output thereof. Said output signal is coupled into an amplifier which passes only the 30 Hz. fundamental. All of the harmonics of both signals introduced into the summing network are herein filtered out, so that the output of said amplifier 17 represents the summation of two 30 Hz. sinusoids, one representing the $R_{DME}$ vector, and the other representing the $-R_p$ vector. Correspondingly, such output is a 30 Hz. sinusoid representing the vector summation of the two input signals, having a magnitude proportional to $R_c$, and a phase of $\theta_c$. This output signal is pictorially represented in FIG. 6, and also at node 18 in FIG. 4.

The resultant "phantom VOR" signal is processed to provide course guidance. In this embodiment of the invention, the airplane can utilize the normal VOR-type display, consisting of a bearing selector, left-right meter, and To-From flag. The pilot interprets this display exactly like a conventional VOR indicator, except that is is based on a phantom, rather than real VORTAC. In conventional equipment, a sinusoid carrying a phase representing the bearing of the aircraft is generated by having the pilot manually add a phase shift to the zero phase reference signal, which signal is compared with the VORTAC signal in a phase detector. The phase detector yields zero output when the input signals are 90° out of phase, and maximum output when they are in phase. Thus, by manually adjusting the amount of phase added to the reference signal to that it is 90° out of phase with the VORTAC signal, the pilot can reduce the phase detector output to zero, whereupon the standard L-R meter is centered at zero. A similar procedure is followed with the course line computer equipment. The pilot manually adjusts the omnibearing signal resolver 19 (FIG. 3), which adds a phase shift to the 30 Hz. reference signal. This signal is amplified and introduced into phase detector 20 (FIG. 4) along with the phantom signal generated at terminal 18. As the operator adjusts unit 19 so that the phase difference between the two signals approaches 90°, the output of phase detector 20 is reduced to zero. This output, amplified by an amplifier 21, drives L-R meter 22. When the pilot has adjusted resolver 19 so that the two inputs to phase detector 20 are exactly 90° apart, the L-R detector will be centered at zero. Having set a phase of $\eta_c+90°$ into the reference signal by manually operating resolver 19, the pilot can now operate the aircraft in the same manner as with conventional VOR apparatus. Any time the aircraft strays from a path between plane 2 and phantom 3, the error signal will be indicated on L-R signal 22, providing the pilot with information as to whether to turn to the left or to the right in order to correct the course. The pilot interprets the L-R meter exactly like a VOR indicator, the only difference being that it is based on a phantom, rather than a real VORTAC.

The phantom VOR signal is also applied to a peak level detector 23. The resultant DC voltage, which is directly proportional to the aircraft-to-phantom distance, is applied to a DME meter 24 to provide the read out of the aircraft distance from the phantom VORTAC.

Conventional circuitry is provided to shift the phase of the phantom VOR signal by 90°, and then compare it in phase detector 27 with the reference signal carrying a phase of $\theta_c+90°$. The output of said phase detector 27 is applied to a DC amplifier 28 which in turn drives a conventional To-From indicator 25. Thus, in this embodiment of my invention, the apparatus provides the same read out indicators as standard VOR-DME equipment, i.e., an L-R meter, and DME distance meter, and a To-From meter. Indeed, if the phantom location were to be chosen as having a distance of zero, i.e., at the VORTAC, the course line computer apparatus would produce exactly the same result as the standard VOR-DME apparatus using the real VORTAC instead of a phantom.

Additional circuitry is provided which senses the presence or absence of a signal representing the aircraft, and, in the absence of such a signal, causes the L-R and To-From meters to be deenergized. This is conventional circuitry which complements the computer apparatus, but which contains no novelty and accordingly is not expressed in the claims.

An additional novel feature of this invention lies in the characteristic of linear offset indication. In conventional VOR equipment, the output of the phase detector is solely a function of the phase difference of the inputs, and consequently an offcenter deflection of the L-R meter represents angle error. My invention takes advantage of the fact that the developed phantom-to-plane signal has an amplitude proportional to distance. The phase detector sensitivity is adjusted to be proportional to this amplitude, as well as to angle error, such that the indicator needle provides linear, rather than angle, course error read out. For instance, when the plane is 14.2 nautical miles from the phantom, a 10° off-course error produces full scale deflection of the L-R needle. At this distance, the plane is 2.5 nautical miles off course. At twice that distance, the amplitude of the signal is twice as great, so full scale needle deflection will be produced by approximately half the angular deflection, with the plane still 2.5 nautical miles off course. Accordingly, the pilot gets a direct read-out of the plane's offset from the computed course, in distance perpendicular to such course. Those familiar with airplane navigation can readily see the advantages of this characteristic, among which is the ability to control the plane in a course parallel to the selected course, an invaluable aid for flying a holding pattern.

Although this invention has been described with reference to a specific form thereof, it would be appreciated that other variations may be made without departing from the spirit and scope of the invention. In particular, it is to be noted that whereas the preferred embodiment of this invention utilizes standard VOR-DME input signals, any signals from a ground station cold be utilized which provide continuous distance and bearing information of the aircraft relative to said ground station. The order and manner in which the signals are processed through the computer need not be exactly as described. For example, the signal representing $R_p$ need not be inverted prior to being squared, but rather the summing network 16 could be a subtracting network. Similarly, the pulse signals could be filtered prior to summation, rather than after. It is to be noted that in the preferred embodiment of this invention, the specific circuits which perform each step of the computation are of conventional design, and any suitable circuit having the functional characteristics described may be used. The accuracy of the computer will be affected by the characteristics and stability of such circuits, as well as by the type of signal filtering throughout the system, but these considerations do not form any part of the invention, and accordingly, are not the basis of any claims.

What I claim is:

1. Electronic Course Line Computer apparatus for providing continuous control signals directing navigation of an aircraft in a direct course to a desired point of destination, and utilizing signals transmitted from a ground station, comprising:
    a. input means for detecting and amplifying a 0° phase reference signal;
    b. input means for isolating and amplifying a variable signal having a phase with respect to said reference signal equal to the bearing of said aircraft with respect to said ground station;
    c. input means to generate a first DC voltage representing the distance from said aircraft to said ground station;
    d. input means to generate a second DC voltage representing the distance from said point of destination to said ground station;
    e. first electronic modulation means to generate a first pulse waveform representing the vector from said ground station to said aircraft, driven by said variable signal and operating on said first DC voltage;
    f. first phase shifting and amplifying means, driven by said reference signal;
    g. inverter means, driven by the output of said first phase shifting and amplifying means;

h. second electronic modulation means to generate a second pulse waveform representing the inverse of the vector from said ground station to said point of destination, driven by the output of said inverter means and operating on said second DC voltage;

i. summing means, into which are coupled said first pulse waveform and said second pulse waveform;

j. amplifying and filtering means, driven by the output of said summing means, to generate a sinusoidal signal representing the vector from said point of destination to said aircraft;

k. second phase shifting and amplifying means driven by said reference signal;

l. first phase detector means into which are coupled (1) the output of said amplifying and filtering means, and (2) the output of said second phase shifting and amplifying means;

m. first display means driven by the output of said first phase detector means;

n. 90° phase shifting means, driven by the output of said amplifying and filtering means;

o. second phase detector means into which are coupled (1) the output of said 90° phase shifting means, and (2) the output of said second manually operated phase shifting means;

p. second display means driven by the output of said second phase detector means;

q. detector means to detect peak-to-peak voltage changes driven by the output of said amplifying and filtering means; and r. third display means driven by the output of said detector means.

2. Apparatus in accordance with claim 1 wherein said first electronic modulation means are comprised of a conventional squarer circuit which controls a chopper circuit, said chopper circuit operating on said first DC voltage, said chopper circuit also being controlled by a set circuit and a calibrating circuit to control the amplitude of the chopper output, and wherein said second electronic modulation means are comprised of similar circuits.

3. Apparatus in accordance with claim 2 wherein said first detector means are sensitive to both the phase difference of the two input signals and the magnitude of the output of said amplifying and filtering means.

4. Apparatus in accordance with claim 3 wherein said first and second phase shifting means are manually operated.

5. Electronic course line computer apparatus for providing continuous control signals for navigation of an aircraft in a direct course to a desired destination, comprising:

a. radio input means to generate electrical representations of the location of an aircraft with respect to a ground location;

b. reference signal means to generate an electrical representation of a 0° course bearing;

c. aircraft bearing signal means, driven by said radio input means, to generate an aircraft bearing signal representing the bearing of the course line between said aircraft and said ground location;

d. first DC voltage means driven by said radio input means to generate a first DC voltage representing the distance of said aircraft to said ground station;

e. first electronic modulation means, operating on said first DC voltage and driven by said aircraft bearing signal, to generate a first pulse waveform representing the vector from said ground station to said aircraft;

f. first manually operated phase shifting means, driven by said reference signal means;

g. inverter means, driven by the output of said first manually operated phase shifting means;

h. second DC voltage means, manually operated, to generate a second DC voltage representing the distance from said destination to said ground station;

i. second electronic modulation means operating on said second DC voltage, and driven by the output of said inverter means, to generate a second pulse waveform representing the inverse of the vector from said ground station to said destination;

j. summing and filtering means, into which are coupled said first pulse waveform and said second pulse waveform; and k. first detection means, driven by the output of said summing and filtering means, to generate a course bearing control signal.

6. Apparatus in accordance with claim 5 wherein said first electronic modulation means are comprised of a conventional squarer circuit which controls a chopper circuit, said chopper circuit operating on said first DC voltage, said chopper circuit also being controlled by a set circuit and a calibrating circuit to control the amplitude of the chopper output, and wherein said second electronic modulation means are comprised of similar circuits.

7. Apparatus in accordance with claim 6 wherein said first detection means include second manually operated phase shifting means to generate a detector reference signal, and coupling means to couple said detector reference signal to said first detection means.

8. A method for computing the course line of an aircraft to a desired point of destination which comprises the processing of radio signals transmitted from a ground station to provide (a) a bearing signal representing the bearing of the course line from said ground station to said aircraft, (b) a reference signal carrying information representing a 0° bearing, and (c) a first DC voltage representing the distance of said aircraft from said ground station, the processing of said bearing signal into a form suitable to drive a first chopper circuit, the chopping of said first DC voltage by said first chopper circuit, thereby generating a pulse waveform representing the vector location of said aircraft with respect to said ground station, the processing of said reference signal whereby it is phase shifted and inverted and caused to drive a second chopper circuit, the generation of a second DC voltage to represent the distance of a said desired location from said ground station, the chopping of said second DC voltage by said second chopper circuit, thereby generating a second pulse waveform representing the vector location of said ground station with respect to said point of destination, the summing and filtering of said first and second pulse waveforms to generate a variable electrical signal carrying amplitude and phase information representing the distance and bearing respectively of the course from said point of destination to said aircraft, and the processing of said variable electrical signal through detection circuits to provide control signals by which said aircraft can be navigated to said desired location.

9. Apparatus for continuously calculating the course line of an aircraft to a given destination, comprising:

a. receiving means to receive radio signals from a ground station, carrying information representing a first bearing and distance of said aircraft with respect to said ground station, and first signal means to generate from said radio signals a first sinusoidal signal representing said first bearing and a first DC signal representing said first distance;

b. input means to introduce information representing a second bearing and distance of said destination with respect to said ground station, and second signal means to generate from said input means a second sinusoidal signal representing said second bearing and a second DC signal representing said second distance;

c. first electronic modulating means controlled by said first bearing signal which operates on said first distance signal, to generate a first square wave representation of the vector from said ground station to said aircraft;

d. second electronic modulating means controlled by said second bearing signal which operates on said second distance signal, to generate a second square wave representation of the vector from said destination to said ground station;

e. summing means coupled to the outputs of said first and second electronic modulating means, to generate a first electrical representation of the vector of said aircraft with respect to said destination;

f. bearing reference means to generate a second electrical representation of a given course bearing;

g. phase comparator means, driven by said first and second electrical representations, to generate a bearing control signal by which the aircraft can be maintained on the proper course to the desired location; and h. bearing display means, driven by said bearing control signal.

10. The apparatus as described in claim 9, comprising distance display means, driven by said first electrical representation, to generate a continuous indication of the distance of said aircraft to said destination.

11. Apparatus for continuously calculating the position of an aircraft with respect to a given destination, said aircraft having VOR-DME equipment for continuously providing AC bearing and DC distance signals representing the aircraft's position with respect to a VORTAC station, comprising:

a. first chopper means driven by said AC bearing signal for chopping the DC distance signal, a first square wave representing the position of said VORTAC station with respect to said aircraft;

b. first generator means for providing a second AC bearing signal representing the bearing of said VORTAC station with respect to said destination;

c. second generator means for providing a second DC distance signal representing the distance of said VORTAC station from said destination;

d. second chopper means driven by said second AC bearing signal for chopping said second DC distance signal, thereby generating a second square wave representing the position of said destination with respect to said VORTAC station; and e. summing means for adding said first and second square waves, thereby generating a square wave representing the position of said destination with respect to said aircraft.

12. The apparatus as described in claim 11 comprising indicator means for continuously indicating variance of said aircraft from a predetermined course to said destination, and for continuously indicating distance of said aircraft to said destination.